March 6, 1956 C. M. BLISS 2,737,147
TRANSMISSION CONTROL INDICATOR ASSEMBLY
Filed Nov. 17, 1954
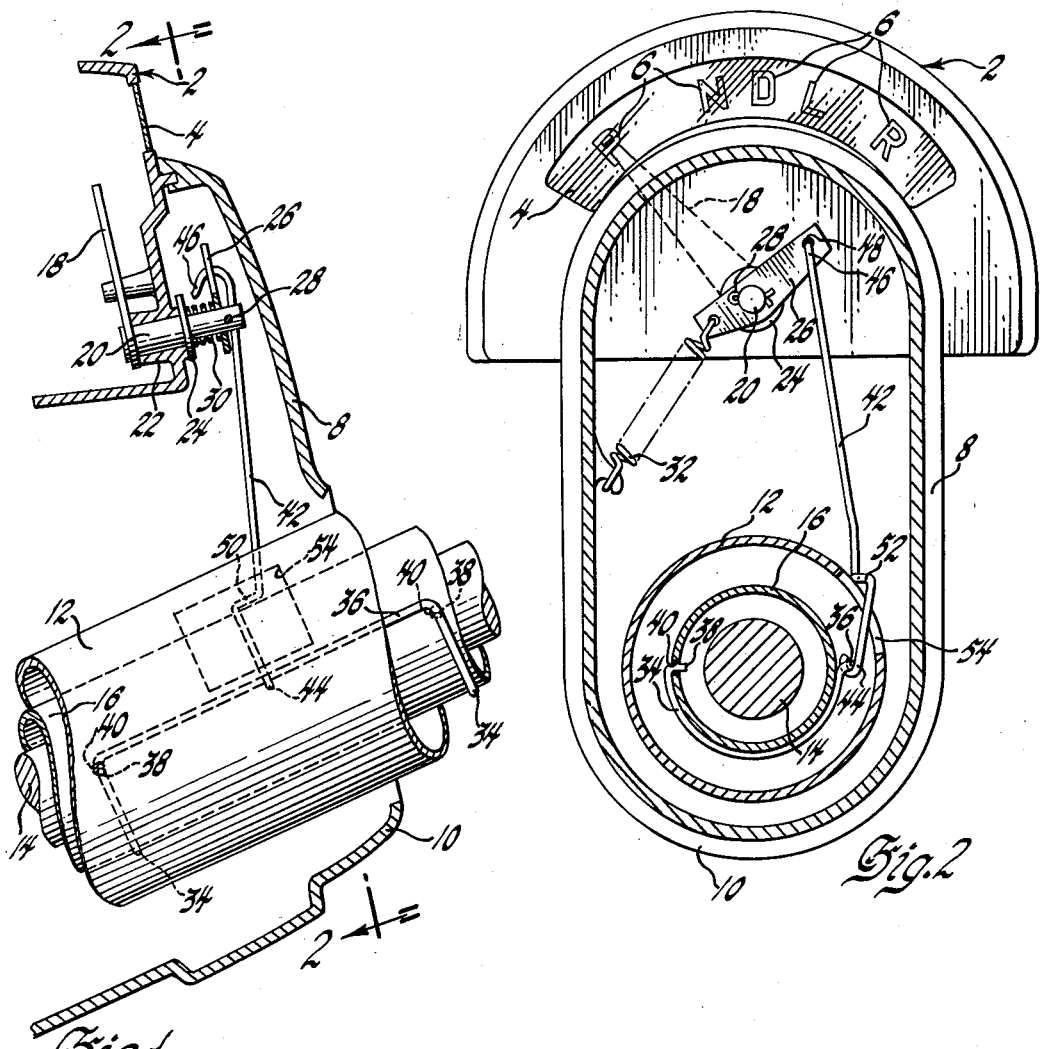
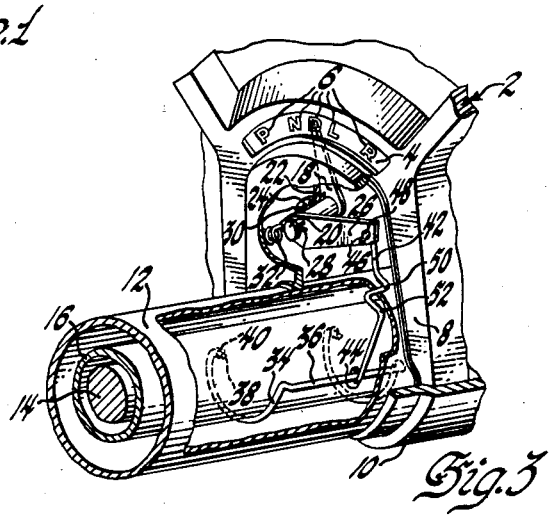
INVENTOR
Carl M. Bliss
BY J. C. Thorpe
ATTORNEY

United States Patent Office 2,737,147
Patented Mar. 6, 1956

2,737,147

TRANSMISSION CONTROL INDICATOR ASSEMBLY

Carl M. Bliss, Oak Park, Mich., assignor to General Motors Corporation, Detroit, Mich., a corporation of Delaware Application November 17, 1954, Serial No. 469,429

8 Claims. (Cl. 116—124)

This invention relates generally to automotive transmissions, more particularly to transmission control indicating means, and specifically to the linkage between the transmission control position indicator and the transmission control tube whose movement by manual operation of the transmission shift lever located adjacent the car steering wheel determines which of the various operating characteristics of the transmission will be used.

As is well known in transmission control assemblies of the type to which the present invention is related the control tube forms a part of the steering column assembly and is concentrically mounted between an inner steering shaft and an outer steering column or mast jacket secured to the underside of the dashboard or instrument panel. This control tube may be moved by means of the manual control shift lever located near the steering wheel so that the tube moves axially with respect to the mast jacket and steering shaft and also rotates relative thereto, the latter movement being used to select the particular transmission operating characteristic. Heretofore the linkages used between the transmission control indicating means and the control tube to transmit the rotatable movement of the control tube and indicate the particular transmission operating characteristic have not sufficiently isolated the axial movement of the control tube from its rotatable movement. As a result upon axial movement of the control tube a transmission change tended to be indicated by the indicator means when in fact no such change had taken place. Furthermore, linkages of the type referred to herein were composed of a relatively large number of parts which due to their unsatisfactory arrangement were subject to frequent replacement and repair.

It is therefore an object of the present invention to provide a linkage between the means indicating which of the transmission operating characteristics is being used and the control tube which will enable the tube to be moved axially without the transferal of any such movement to the indicating means.

It is a further object of this invention to provide an improved simplified linkage between the means indicating which of the operating characteristics of a transmission is being used and the control tube which is rotated to effect the various operating characteristics of the transmission.

For a further understanding of this invention and the objects thereof reference may be had to the accompanying detailed description and drawing, in which:

Fig. 1 is a sectional side view in elevation through the lower porton of an automotive dashboard or instrument panel illustrating the linkage between the transmission position indicator and the control tube concentrically mounted between an inner steering shaft and an outer mast jacket suitably secured to the underside of the instrument panel or dashboard.

Fig. 2 is a section taken on the line 2—2 of Fig. 1 further illustrating the unique linkage.

Fig. 3 is a view in perspective of the linkage of Figs. 1 and 2 except that with the upper end of the indicator positioning rod inserted in reverse direction through the indicator lever.

Referring to the accompanying drawing, an instrument panel indicated generally by a numeral 2 is shown having mounted therein an indicator dial 4 having indicia 6 thereon which corresponds to the various transmission control positions, i. e., P represents "Park" or a "Parking" position, N represents a "Neutral" position, D represents a "Driving" position, L a so-called "Low" position and R a "Reverse" position. Suitably secured to the instrument panel 2 by housing and support means 8 and 10 is a steering column assembly comprising an outer steering column or mast jacket 12, an inner steering shaft 14 and a control tube 16 concentrically mounted therebetween. The mast jacket, control tube and steering shaft are suitably mounted so that the control tube may be rotated relativie to the other two members and also move axially wih respect thereto to achieve the various transmission operations. This movement of the control tube 16 is accomplished by means of a gear shift lever (not shown) connected to the upper end of the tube adjacent the steering wheel, the lever being operated by the operator of an automotive vehicle in a conventional manner.

In order to indicate to the operator that he has placed the operating lever and consequently the control tube 16 in the proper position to obtain the desired transmission operating characteristic, a pointer or indicator 18 has been provided which is pivotally attached by a pin 20 journaled in a boss 22 provided adjacent the lower edge of the instrument panel 2. The pin 20 is suitably keyed or otherwise secured to the indicator pointer 18 so that it extends through one end thereof, through boss 22 and also through a washer 24 and a lever 26 intermediate the ends of the lever. The lever 26 is also suitably attached to pin 20 for rotation therewith and is maintained on the pin by means of a cotter pin 28. An antirattling spring 30 encircles the pin 20 and has its opposite ends in abutment with the washer 24 and the lever 26. One end of the lever 26 is connected by means of a small helical coil spring 32 to a lug on one side of the supporting means 8—10.

As best seen in Fig. 3, a wire clip comprising two arcuately shaped portions 34 spaced by an axially extending portion 36 is snapped in place around the outer surface of the control tube 16 by means of bent portions 38 on the arcuate portions 34 extending into suitable holes 40 provided in the wall of the control tube. Connecting the axially extending portion 36 to the end of the lever 26 opposite the end to which the spring 32 is connected is a wire rod 42 having one end 44 looped about the axially extending portion 36 and the opposite end 46 hooked into a hole 48 provided in the end of the lever 26. The wire rod 42 is suitably kinked, as at 50 and 52, so that the loop end 44 may be properly located on the axially extending portion 36 and rod 42 may extend through a suitable opening or window 54 provided in the wall of the mast jacket 12.

The operation of the linkage is as follows: When the control tube 16 is initially moved axially so as to allow the control tube to be rotated to its different operating positions this axial movement is allowed without being transmitted through the link 42 up to the indicator means because of the looped end 44 which may slide axially on axially extending portion 36. Upon clockwise rotation of the control tube 16, however, as viewed in the figures, the rod 42 will be moved downwardly, as viewed in Fig. 2, causing the lever 26, pin 20 and the pointer 18 to also move in a clockwise direction. If this clockwise pivotal movement occurs so that the indicator pointer moves from P to N the control tube 16 will operate the transmission so that it takes a "Neutral" operating characteristic. Further clockwise movement of the control tube 16, as viewed in the drawing, will cause the pointer to move from N to D in which case it will be in a "Driving" position, and so on.

From the foregoing description it may be appreciated that an improved linkage between the transmission control indicating means and the transmission control tube has been provided which properly isolates the axial movement of the control tube from the rotatable movement thereof so that the former movement is not in any way transferred to the indicating means while at the same time simplifying and improving the linkage.

I claim:

1. In a transmission control assembly including a transmission control tube concentrically mounted between an inner steering shaft and an outer mast jacket of a steering column assembly for rotatable movement relative thereto, an instrument panel to which said steering column assembly is secured, a control tube position indicating means movably mounted on said panel, and a link connecting said indicating means to said control tube whereby rotatable movement of said control tube to any of a plurality of operating positions causes movement of said indicating means to a position indicating the operating position of said control tube.

2. In a transmission control assembly including a transmission control tube concentrically mounted between an inner steering shaft and an outer mast jacket of a steering column assembly for rotatable movement relative thereto, an instrument panel to which said assembly is secured, a control tube position pointer having a point of pivotal attachment to said panel, a lever connected to said pointer for rotation therewith about said point, biasing means connecting one end of said lever to said support, and means connecting the opposite end of said lever to said control tube whereby movement of said control tube to any of a plurality of operating positions causes movement of said pointer to a position indicating the position of said control tube, said last-mentioned means comprising a clip secured to said control tube for axial movement therewith, said clip having an axially extending rod portion, and a rod connected at one end to the opposite ends of said lever, the opposite end of said rod being looped about said axially extending portion for sliding movement with respect thereto whereby said control tube may move axially without said axial movement being transmitted to said indicator pointer.

3. In combination, a steering column assembly and a transmission control assembly including a transmission control tube concentrically mounted between an inner steering shaft and an outer mast jacket for axial reciprocating and rotatable movement relative thereto, said tube having a plurality of operating positions to which it may be rotated after applying predetermined axial movement thereto, an instrument panel to which said steering column assembly is secured, indicia on said panel corresponding to said plurality of operating positions, an indicator pivotally mounted on said panel and cooperating with said indicia, a lever connected to said indicator for movement therewith, and linkage means to connect said lever to said control tube to transmit rotatable movement thereof to said indicator and prevent the transmittal of axial movement of said tube to said indicator.

4. In a transmission control assembly, an instrument panel, indicator means movably mounted on said panel, an elongated control member axially rotatable and maintained in axial alignment by said panel, a linkage between said indicator means and said member comprising, a lever connected to said indicator for movement therewith, and a link pivotally connected at opposite ends to said lever and said member radially spaced from the axis of said member.

5. In a transmission control assembly movable indicator means for indicating transmission operating characteristics, a control member rotatable to select transmission operating characteristics, and means connecting said indicator means to said control member comprising a lever connected to said indicator means for movement therewith, and a link pivotally connected to said lever and said control member, the pivotal connection of said link to said member being radially spaced from the axis of and movable along said member.

6. In combination, a steering column assembly including an inner steering shaft and an outer steering column, a transmission control assembly including a transmission control tube concentrically mounted between said shaft and column for axial and rotatable movement relative thereto, transmission control indicating means mounted on said column and including a dial indicator having a pointer pivotally supported by said column, spring means pivotally biasing said pointer in one direction and means connecting said pointer to said control tube comprising a lever secured intermediate the ends thereof to said pointer for rotation therewith, a wire rod hooked through a hole in one end of said lever, the other end of said rod being linked to said control tube so as to respond only to rotational movement of said control tube.

7. In combination in a steering column assembly and a transmission control assembly including a transmission control tube concentrically mounted between an inner steering shaft and an outer mast jacket for axial reciprocating and rotatable movement relative thereto, said tube having a plurality of transmission operating positions to which it may be rotated after applying predetermined axial movement thereto, a support to which said steering column assembly is secured, indicia on said support corresponding to said plurality of operating positions, an indicator pivotally mounted on said support and cooperating with said indicia, a lever connected intermediate the ends thereof to said indicator for movement therewith, and means to connect said lever to said control tube to transmit rotatable movement thereof to said indicator and prevent the transmittal of axial movement of said tube to said indicator comprising, a clip having arcuate portions spaced axially on said control tube and connected to said tube by means of ends on said portions bent and extending into holes provided in the wall of said control tube, said clip including an axially extending rod portion joining the opposite ends of said arcuate portions and spaced from the outer wall of said control tube, and a wire link having a curved end hooked through a hole in one end of said lever, the opposite end of said wire link being looped around said axially extending portion, said rod being kinked intermediate the ends thereof so as to extend through an opening in said jacket.

8. In combination with a transmission control assembly and an instrument panel, a transmission indicator movably mounted on said panel, and an elongated control member rotatable about its axis and movable therealong; a linkage between said indicator and control member transmitting only the rotatable movement of said member to said indicator comprising a link operatively connected to said indicator and to said member radially spaced from the axis thereof, the connection between said link and member including an element guiding said link for movement of said member relative thereto parallel to the axis of said member.

References Cited in the file of this patent

UNITED STATES PATENTS

| | | |
|---|---|---|
| 2,672,116 | Gunderson | Mar. 16, 1954 |
| 2,693,713 | Reid | Nov. 9, 1954 |
| 2,696,126 | Lincoln | Dec. 7, 1954 |